G. L. THORNTON & E. A. OLSEN.
CHAIN.
APPLICATION FILED JUNE 6, 1916.
1,293,247.
Patented Feb. 4, 1919.
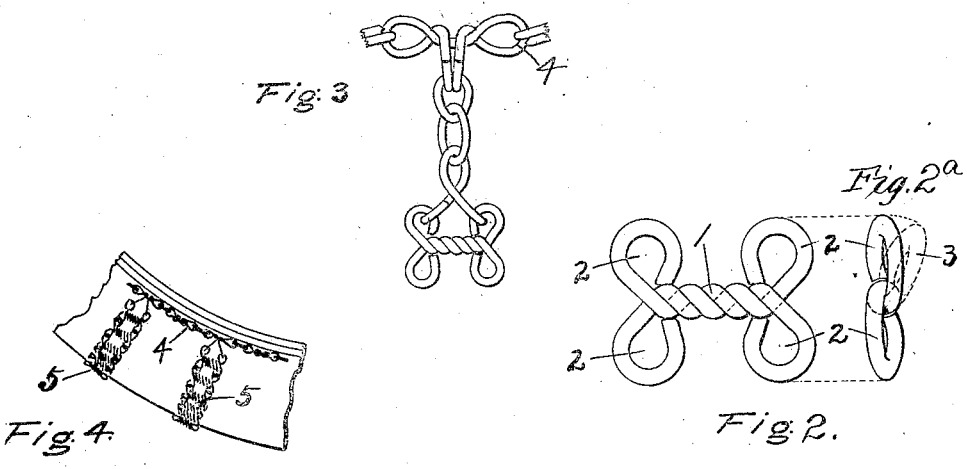
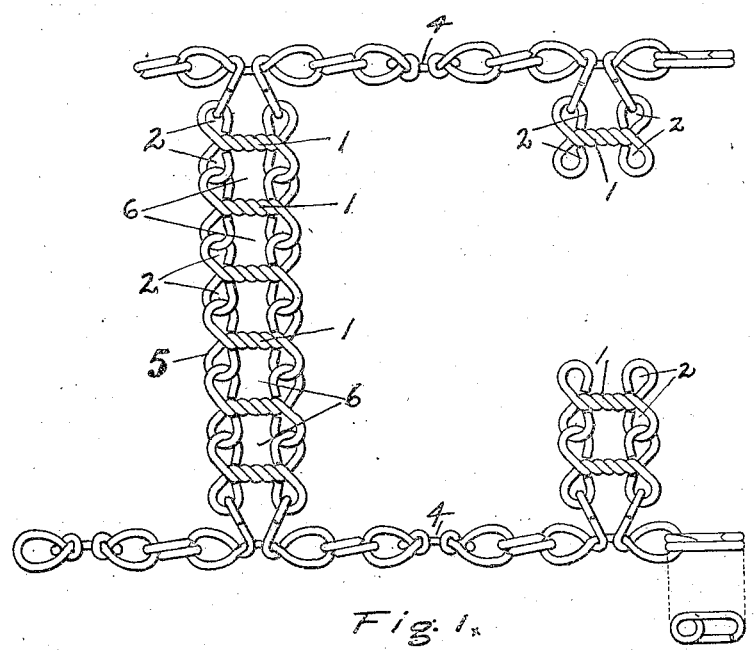

UNITED STATES PATENT OFFICE.

GILBERT L. THORNTON AND EDWARD A. OLSEN, OF PORTLAND, OREGON.

CHAIN.

1,293,247.      Specification of Letters Patent.      Patented Feb. 4, 1919.

Application filed June 6, 1916. Serial No. 101,922.

*To all whom it may concern:*

Be it known that we, GILBERT L. THORNTON and EDWARD A. OLSEN, citizens of the United States, residing in the city of Portland, county of Multnomah, and State of Oregon, have invented certain new and useful Improvements in Chains, of which the following is a specification.

Our invention relates to certain improvements in chains, and more particularly to a new form of link from which a chain having special advantages can be made, as, for example, a non-skid chain, or it can be used as a sprocket chain, because of the uniform openings between the links.

Among the salient objects of our invention is to provide in a chain a link having four attaching loops, or openings, having two on each side of its body portion, whereby when the two loops or openings at one side of a link are connected to the corresponding loops, or openings of an adjacent link, there is left between the body portions, which are parallel with each other, and between the connected loops or openings, a uniform opening, or space. Our link is especially adapted for non-skid chains, for the reason that each link has four connections, and in case any one connection or loop is broken the chain is not parted in a way to leave a large area of the tire exposed. Another object of our link is that in the preferred form thereof, each link is composed of two pieces of wire twisted together and movable relative to each other, hinge fashion, so that the links more readily conform to the transverse curvature of the tire when used in a non-skid chain.

In order that others may more clearly understand our invention, we have illustrated the preferred form thereof in the accompanying sheet of drawings, which we will now describe.

Figure 1 is a fragmentary view showing two side chains with a connecting chain formed of our improved links.

Fig. 2 shows a flat view of one of our links,

Fig. 2ª shows an end view thereof with one part moved relative to the other part, as indicated in dotted lines.

Fig. 3 shows a means of connecting a shorter series of our new links to the side chains, as where only three or four of our links are used in the middle of the tire tread; and Fig. 4 is a fragmentary view of a tire showing two sets of our links as applied thereto.

Referring now more in detail to the drawings, our improved chain, as here illustrated, is composed of a series of links 1—1, each link being composed of two short pieces of wire twisted together in the manner shown, and having their opposite ends formed into connecting loops, or openings, as 2—2. The two parts are movable relative to each other in the manner shown at 3, in dotted lines, Fig. 2, that is, the two parts turn slightly one upon the other, about an axis extending longitudinally through the twisted portions, as will be clear from Fig. 2. Thus the opposite loops 2—2, on the different pieces composing the link, can conform to the transverse curvature of the tire, which is an advantage over a construction in which the two parts are rigidly secured together, although this form is an improved construction over any form of links with which we are familiar.

In the drawings, 4—4, designate side chains adapted to be connected at intervals by short chains 5, made up of our improved links 1—1.

Our improved links, when connected together, as shown, with their twisted body portions in spaced parallel relationship, form uniform spaces 6—6 therebetween.

While we have shown our link made of twisted wire having a body portion with four attaching loops, or openings, we are aware that links of the same general outline and having four attaching loops, or openings, will come within the spirit of our invention, and we do not, therefore, limit our invention to the particular form here shown, except as we may be limited by the hereto appended claims.

We claim:

1. In a chain, a series of links, each comprising a body composed of two twisted wires, each of which is formed into a connecting loop at its opposite ends, whereby to form four connecting loops for each link, the two parts of each link being movable relative to each other, substantially as described.

2. In combination with a wheel, holding means at opposite sides of the tire, connecting chains extending from one side of said tire over to the other side, comprising a series of links, each link comprising a twisted body having a pair of closed, independent connecting loops at each end, said links being connected together by said loops with their body portions in spaced parallel relationship, substantially as described.

3. A chain of the character referred to composed of a series of links, each comprising a body made of two twisted wires, each of which is formed into a connecting loop at its opposite ends, whereby to form four connecting loops for each link, said links being connected to each other with the body portions of the links in spaced parallel relationship, substantially as described.

Signed at Portland, Multnomah county, Oregon, this 31st day of May, 1916.

GILBERT L. THORNTON.
EDWARD A. OLSEN.

In presence of—
I. M. GRIFFIN,
J. C. STRENG.